(12) United States Patent
Fiorone et al.

(10) Patent No.: US 8,787,150 B2
(45) Date of Patent: Jul. 22, 2014

(54) RESILIENCY SCHEMES IN COMMUNICATIONS NETWORKS

(75) Inventors: Raoul Fiorone, Genoa (IT); Riccardo Martinotti, Savona (IT); Andrea Corti, Varazze (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 34 days.

(21) Appl. No.: 12/443,708

(22) PCT Filed: Oct. 9, 2006

(86) PCT No.: PCT/EP2006/009730
§ 371 (c)(1),
(2), (4) Date: May 5, 2009

(87) PCT Pub. No.: WO2008/043374
PCT Pub. Date: Apr. 17, 2008

(65) Prior Publication Data
US 2010/0002578 A1 Jan. 7, 2010

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*G06F 15/173* (2006.01)

(52) U.S. Cl.
USPC .............................. 370/217; 370/228; 709/239

(58) Field of Classification Search
None
See application file for complete search history.

(56) References Cited

U.S. PATENT DOCUMENTS

| 5,483,519 | A | 1/1996 | Satomi et al. |
| 5,835,696 | A | 11/1998 | Hess |
| 5,848,227 | A | 12/1998 | Sheu |
| 6,283,465 | B1 | 9/2001 | Etter |
| 7,283,465 | B2 | 10/2007 | Zelig et al. |
| 7,313,087 | B2 | 12/2007 | Patil et al. |
| 7,345,991 | B1 * | 3/2008 | Shabtay et al. ............... 370/221 |
| 7,484,010 | B2 | 1/2009 | Sridhar et al. |

(Continued)

FOREIGN PATENT DOCUMENTS

| EP | 1489861 A2 | 12/2004 |
| EP | 1653687 A1 | 5/2006 |

(Continued)

OTHER PUBLICATIONS

Lang, J. P. et al. "RSVP-TE Extensions in Support of End-to-End GMPLS-based Recovery." CCAMP Working Group, Internet Draft, Feb. 2004. Available online at: http://tools.ietf.org/html/draft-ietf-ccamp-gmpls-recovery-e2e-signaling-03. XP002446707.

(Continued)

*Primary Examiner* — Suk Jin Kang
(74) *Attorney, Agent, or Firm* — Coats & Bennett, P.L.L.C.

(57) ABSTRACT

A connection oriented communications network has a plurality of nodes including a plurality of edge nodes. The network is arranged to define a primary tunnel connecting a primary one of the edge nodes to another edge node and a secondary tunnel connecting a secondary one of the edge nodes to another edge node. The network is arranged to enable switching of traffic from the primary tunnel to the secondary tunnel in the event of detection of a failure in the primary tunnel.

11 Claims, 2 Drawing Sheets

(56) References Cited

U.S. PATENT DOCUMENTS

| | | | |
|---|---|---|---|
| 7,505,402 B2 | 3/2009 | Filsfils et al. | |
| 7,535,828 B2 | 5/2009 | Raszuk et al. | |
| 7,644,317 B1 | 1/2010 | Sajassi et al. | |
| 7,646,769 B2 | 1/2010 | Arai et al. | |
| 7,983,150 B2 | 7/2011 | Bruckman et al. | |
| 2002/0112072 A1 | 8/2002 | Jain | |
| 2003/0123446 A1 | 7/2003 | Muirhead | |
| 2003/0140164 A1 | 7/2003 | Kitamura | |
| 2003/0154259 A1 | 8/2003 | Lamberton et al. | |
| 2003/0233595 A1 | 12/2003 | Charny et al. | |
| 2004/0078632 A1 | 4/2004 | Infante et al. | |
| 2004/0156310 A1* | 8/2004 | Fredette et al. | 370/216 |
| 2004/0165600 A1 | 8/2004 | Lee | |
| 2005/0025069 A1* | 2/2005 | Aysan | 370/254 |
| 2005/0089010 A1 | 4/2005 | Rue et al. | |
| 2005/0152269 A1* | 7/2005 | Liu | 370/225 |
| 2005/0243713 A1 | 11/2005 | Okuda | |
| 2006/0002370 A1 | 1/2006 | Rabie et al. | |
| 2006/0031490 A1* | 2/2006 | Provine et al. | 709/225 |
| 2006/0047851 A1 | 3/2006 | Voit et al. | |
| 2006/0126495 A1* | 6/2006 | Guichard et al. | 370/216 |
| 2006/0164975 A1 | 7/2006 | Filsfils et al. | |
| 2006/0209682 A1* | 9/2006 | Filsfils et al. | 370/219 |
| 2006/0221813 A1 | 10/2006 | Scudder et al. | |
| 2007/0091794 A1* | 4/2007 | Filsfils et al. | 370/228 |
| 2007/0091795 A1* | 4/2007 | Bonaventure et al. | 370/228 |
| 2007/0091796 A1* | 4/2007 | Filsfils et al. | 370/228 |
| 2007/0121486 A1* | 5/2007 | Guichard et al. | 370/216 |
| 2007/0124464 A1 | 5/2007 | Lean et al. | |
| 2007/0133406 A1* | 6/2007 | Vasseur | 370/230 |
| 2007/0140247 A1* | 6/2007 | Ansari | 370/392 |
| 2007/0201355 A1* | 8/2007 | Vasseur et al. | 370/217 |
| 2007/0217419 A1* | 9/2007 | Vasseur | 370/392 |
| 2007/0220175 A1* | 9/2007 | Khanna et al. | 709/251 |
| 2007/0268915 A1 | 11/2007 | Zelig et al. | |
| 2007/0280102 A1* | 12/2007 | Vasseur et al. | 370/225 |
| 2008/0068983 A1* | 3/2008 | Dunbar et al. | 370/216 |
| 2008/0279110 A1 | 11/2008 | Hart et al. | |
| 2008/0285442 A1 | 11/2008 | Bruckman et al. | |
| 2009/0010182 A1* | 1/2009 | Tochio | 370/254 |

FOREIGN PATENT DOCUMENTS

| | | |
|---|---|---|
| JP | 11017686 | 1/1999 |
| JP | 11041282 A | 2/1999 |
| JP | 11220486 A | 8/1999 |
| JP | 2003218911 A | 7/2003 |
| JP | 2004146989 A | 5/2004 |
| JP | 2005012812 A | 1/2005 |
| JP | 2005033485 A | 2/2005 |
| JP | 2005057514 | 3/2005 |
| JP | 2006504186 A | 2/2006 |
| JP | 2006129094 A | 5/2006 |
| JP | 2006135872 A | 5/2006 |
| JP | 2006135972 A | 5/2006 |
| JP | 2007208794 A | 8/2007 |

OTHER PUBLICATIONS

Papadimitriou, P. "RE: Shared Mest Restoration—e2e Recovery Signaling Draft." Jul. 26, 2006. Available online at: http://psg.com/lists/ccamp/ccamp.2006/msg00574.html. XP002446708.

Sharma, V. et al. "Framework for Multi-Protocol Label Switching (MPLS)-based Recovery." Network Working Group, Request for Comments: 3469, Feb. 2003. Available online at: http://www.ietf.org/rfc/rfc3469.txt. XP015009252.

Bangnulo M. et al, "Multi-homing tunnel broker", Euromicro Conference, 2004. Proceedings 30th Rennes, France Aug. 31-Sep. 3, 2004 Piscataway, NJ, USA, IEEE Aug. 31, 2004, pp. 282-280, XP010723602 ISBN: 978-0-7695-2199-2.

Pelsser C. et al., Extending RSVP-TE to support inter-AS LSPs, High Performance Switching and Routing, 2003, HPSR. Workshop on Jun. 24-27, 2003, Piscataway, NJ, USA, IEEE Jun. 24, 2003, pp. 79-84, XP010654648 ISBN: 978-0-7803-7710-3.

Higginson, Peter L. et al. "Development of Router Clusters to Provide Fast Failover in IP Networks." Digital Technical Journal, vol. 9, No. 3, 1997, pp. 32-41.

Lasserre, Marc et al. "Virtual Private Lan Services Using LDP." 28 pages. Internet Engineering Task Force, Internet Draft Document, L2VPN Working Group, vol. 12vpn, No. 9, Jun. 2006. The Internet Society, Reston, VA.

Muley, Praveen et al. "Pseudowire (PW) Redundancy." 12 pages. Internet Engineering Task Force, Network Working Group, Internet Draft, Sep. 22, 2006. The Internet Society, Reston, VA.

Li, T. et al. "Cisco Hot Standy Router Protocol (HSRP)." 16 pages. Internet Engineering Task Force, Network Working Group, Request for Comments: 2281, Mar. 1998. The Internet Society, Reston, VA.

Network World, "Impact of Guaranteed Networks (advertisement)", Network World, separate volume of Windows Server World, IDG Japan, Inc. No. 10, vol. 4, Apr. 1, 2005, pp. 6-7 (Published in Japanese Only).

\* cited by examiner

US 8,787,150 B2

RESILIENCY SCHEMES IN COMMUNICATIONS NETWORKS

FIELD OF THE INVENTION

The present invention relates to network resiliency schemes in connection oriented networks. It has particular application in multi-protocol label switched (MPLS), and connection oriented Ethernet networks.

BACKGROUND OF THE INVENTION

Network resiliency schemes are generally arranged to compensate for failures in a network by detecting failure of one of the nodes, or inter-node connections, in the network, and re-routing traffic to bypass the failure. Networks generally have a number of edge nodes at which traffic can enter and leave the network, and a number of intermediate nodes through which traffic can pass to travel from any one edge node to any other. Customer equipment that is arranged to communicate over the network will generally communicate with one or more edge nodes. In the simplest type of scheme, any piece of customer equipment can only communicate with one edge node. Therefore any re-routing carried out by the resiliency scheme cannot bypass the ingress node at which traffic enters the network, or the egress node at which it leaves the network. In some systems, dual parenting schemes are known in which the customer equipment can communicate with more than one ingress or egress node. This has the advantage that, if one of the edge nodes suffers a failure, then the customer equipment can still communicate over the network. However, no such dual parenting scheme is currently available for MPLS or other connection oriented networks. This means that resiliency schemes for MPLS networks rely on path diversity between the same ingress and egress nodes, and are therefore limited in the degree of resilience they can provide.

SUMMARY OF THE INVENTION

Accordingly, the invention seeks to preferably mitigate, alleviate or eliminate one or more of the disadvantages mentioned above singly or in any combination.

According to a first aspect of the present invention there is provided a connection oriented communications network comprising a plurality of nodes including a plurality of edge nodes, wherein the network is arranged to define a primary tunnel connecting together a primary pair of the edge nodes, and a secondary tunnel connecting together a secondary pair of the edge nodes, which is different from the primary pair, and wherein the network is arranged to enable switching of traffic from the primary tunnel to the secondary tunnel in the event of detection of a failure affecting the primary tunnel.

The first and second pair of nodes may have a common node, but each have at least one node that is not common to both pairs.

According to a second aspect of the present invention there is provided a node for a connection oriented network having a plurality of edge nodes, the node being arranged to identify a primary tunnel connecting together a primary pair of the edge nodes, and a secondary tunnel connecting together a secondary pair of the edge nodes, which is different from the primary pair, and wherein the node is arranged to enable switching of traffic from the primary tunnel to the secondary tunnel in the event of detection of a failure in the primary tunnel.

Further features of the present invention are as claimed in the dependent claims.

The present invention beneficially allows for network resiliency in an MPLS network, or other connection oriented network with node diversity.

Preferred embodiments of the present invention will now be described by way of example only with reference to the accompanying drawings.

DESCRIPTION OF PREFERRED EMBODIMENTS OF THE INVENTION

Figure 1:
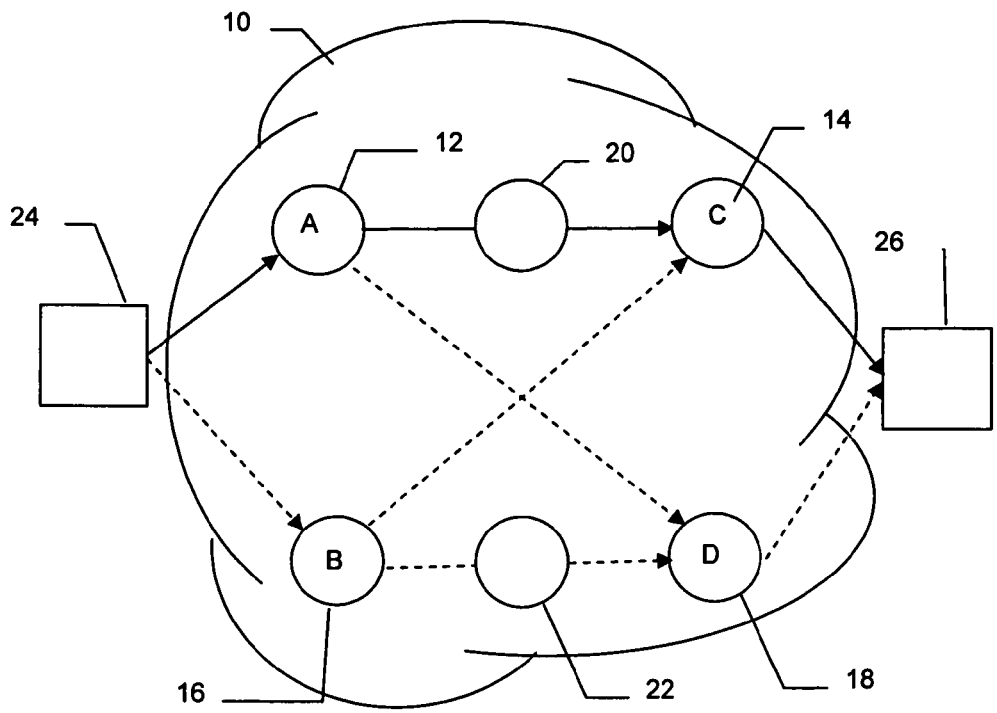
FIG. 1 is a diagram illustrating an MPLS network according to one embodiment of the present invention.

Referring to FIG. 1, a multiprotocol label switching (MPLS) network 10 according to an embodiment of the invention comprises a number of edge nodes 12, 14, 16, 18 and a number of intermediate nodes 20, 22. Various devices, in this case referred to as items 24, 26 of customer equipment, are arranged to communicate over the network 10. Only two customer equipment units 24, 26 are shown for simplicity although it will be appreciated that in practice the number will generally be much larger.

As is conventional each of the nodes 12, 14, 16, 18, 20, 22 includes one or more processors and associated memory and is arranged to perform a number of functions relating to the operation of the network, and these functions are grouped, from an organisational point of view, into planes. The management plane provides overall management of the network and includes a network management system (NMS) that provides an interface for a user to provide manual control of the network. The control plane uses a number of protocols and allows for communication between the nodes and configuration of the forwarding plane. The forwarding plane performs the forwarding operations that transmit data across the network. The control plane protocols, which can include, for example, OSPF-TE and RSVP-TE, are also arranged to provide communication between the edge nodes 12, 14, 16, 18 and optionally the customer equipment 24, 26. One of the main functions of the control plane protocols is to determine the route that any communication will take across the network.

In order for the two customer equipment (CE) units 24, 26 to be able to communicate with each other, the control plane protocol of the network identifies one primary edge node 12 for one of the customer equipment units 24, and one primary edge node 14 for the other 26. For communication from the first unit 24 to the second 26, the first primary edge node 12 is defined as the primary ingress node and the second primary edge node 14 is defined as the primary egress node. The control plane protocols also define a number of communications tunnels each of which provides communication from one of the edge nodes 12, 14, 16, 18 to another. Each of the tunnels is a route between two nodes along which traffic can be transmitted in the network 10 such that the traffic, which is in the form of packets in an MPLS network, is opaque to intermediate nodes. In an MPLS network this can be achieved because the intermediate nodes only read the label on each packet and not the data within the packet. The ingress node 12 that directs the traffic across the network identifies the egress node 14 to which it needs to send the traffic, and then attaches labels to the information which identify which tunnel it is to be transmitted through. Each tunnel is defined by a number of parameters, which include the two edge nodes that the tunnel connects. Other defining parameters of the tunnels can include any one or more of the following, all of which are included in this embodiment: the characteristics of the traffic it can carry, the quality of service (QoS) scheme it operates, the service class associated to the MPLS tunnel, its maximum and mean bandwidth, its maximum burst size for example. It is therefore possible to have more than one tunnel between any pair of edge nodes, the two tunnels having different characteristics or parameters. Each tunnel may include only a single label switch path (LSP), or it may include a plurality of LSPs the most appropriate of which will be selected at any given time depending on the characteristics and performances required by the client service. It will be appreciated that the customer traffic transmitted in the tunnel can be encapsulated into pseudo-wires arranged to support Ethernet services as well as any type of service admitted in the network.

During communication over the network, a number of checks are carried out by the nodes as defined by the control plane protocols to identify failures in the network. Many methods of detecting failures are well known and will not be described in detail. A management information base (MIB), which is related to and assists the control plane, is arranged to store data relating to what faults are detected in the network. Also all of the nodes of the network are arranged to communicate with each other to check for, and communicate information about, failures in the network, which will affect which of the tunnels is available for use at any time. This form of checking is carried out when the CE unit 24 first transmits a communication for transmission across the network and will be described in more detail below. This allows selection of which of the tunnels is used depending on what faults are present.

For any type of communication between the CE unit 24 and the CE unit 26 a primary tunnel is defined which has one edge node 12 as its ingress node, and one edge node 14 as its egress node. In this embodiment the sending CE unit 24 is linked to, and can communicate with, a secondary ingress node 16, as well as the primary ingress node 12, and the receiving CE unit 26 is linked to, and can communicate with, a secondary egress node 18, as well as the primary egress node 14. The primary tunnel AC is therefore defined from the primary ingress node 12 to the primary egress node 14. Three secondary tunnels are also defined: one AD from the primary ingress node 12 to the secondary egress node 18, one BC from the secondary ingress node 16 to the primary egress node 14, and one BD from the secondary ingress node 16 to the secondary egress node 18. Therefore each of the tunnels is between a different pair of nodes, having one of its nodes in common with one other tunnel, another of its nodes in common with another tunnel, and no nodes in common with the remaining tunnel.

When the sending CE unit 24 wants to start communicating with the CE unit 26 it is arranged to direct the communication traffic to the primary ingress node 12. This traffic includes an identification of the customer equipment unit 26 that the communication is to be transmitted to, as well as information regarding the characteristics of the communication. On receiving this communication, the primary ingress node is arranged to start transmitting over the network to the primary egress node, and to trigger a number of communications between the edge nodes to check for any faults that might result in a need for a tunnel other than the primary tunnel to be used for the communication. It will be appreciated that these communications between the edge nodes can take a number of formats, but it is desirable that they are sufficient to identify which of the tunnels are available for use and which are not.

In this embodiment the primary ingress node 12, which is now the active ingress node, sends the traffic from the CE unit 24 to the primary egress node 14. The active egress node, on receiving the traffic, sends it on to the receiving CE unit 26 and monitors the traffic. Suitable instruments, using either standard messages or a proprietary protocol, are used to check whether or not the LSP tunnel is successfully transporting the traffic from the active ingress node to the active egress node. This enables the active ingress node 12 to determine if there is a fault in the primary tunnel AC. Provided no fault is detected on the primary tunnel, the traffic continues to be transmitted via the primary tunnel.

Also, when the communication begins, the primary and secondary edge nodes are arranged to exchange a series of messages so that each of them can determine which is the current active tunnel, which are the secondary or standby tunnels, and whether there are any faults in the primary or any of the secondary tunnels. It will be appreciated that these messages can take a number of forms. In this embodiment, the state message to verify LSP integrity is also sent to the standby ingress node 16. Proper signalling messages are also exchanged between the primary ingress node 12 and the secondary ingress node 16 to identify their respective status as ingress nodes. This enables the active ingress node 12 to check whether the secondary ingress node 16 has experienced a fault or not. The active ingress node 12 also sends a check signal to the secondary egress node 18 to enable it to identify its status as secondary egress node. The active ingress node 12 is enabled to check whether the standby egress node 18 is available for use if necessary, by means of keep-alive signalling messages, which are periodically exchanged between the two nodes. The active ingress node 12 is also arranged to send an acknowledgement signal back to the sending CE unit 24 to confirm that it is receiving the traffic and sending it over the network to the receiving CE unit 26. All of these signals and checks can be repeated during the communication to check continually on the status of each of the tunnels. These signals and checks can be exchanged among primary and standby edge nodes enabling them to check the status of the network.

For as long as the primary tunnel AC continues to function and provide the communication required, the communication will continue over it. However, if a fault is detected in either of the primary edge nodes 12, 16, or indeed in any intermediate nodes 20 forming part of the primary tunnel AC that cannot be bypassed within the primary tunnel, then the network is arranged to switch to one of the standby tunnels so that communication can continue. The most appropriate tunnel will be selected depending on which of the nodes and LSPs are functioning correctly. Each of the nodes 12, 14, 16, 18, 20, 22 is arranged to monitor for and identify faults during the communication, and if any of them identifies a fault that requires, or might require, a change of active tunnel, then it is arranged to communicate this to each of the other edge nodes. In this way all of the edge nodes can maintain an accurate record of which is the currently active tunnel, and whether there are any faults in any of the edge nodes 12, 14, 16, 18 or intermediate nodes 20, 22 that might affect the choice of active tunnel.

Figure 2:
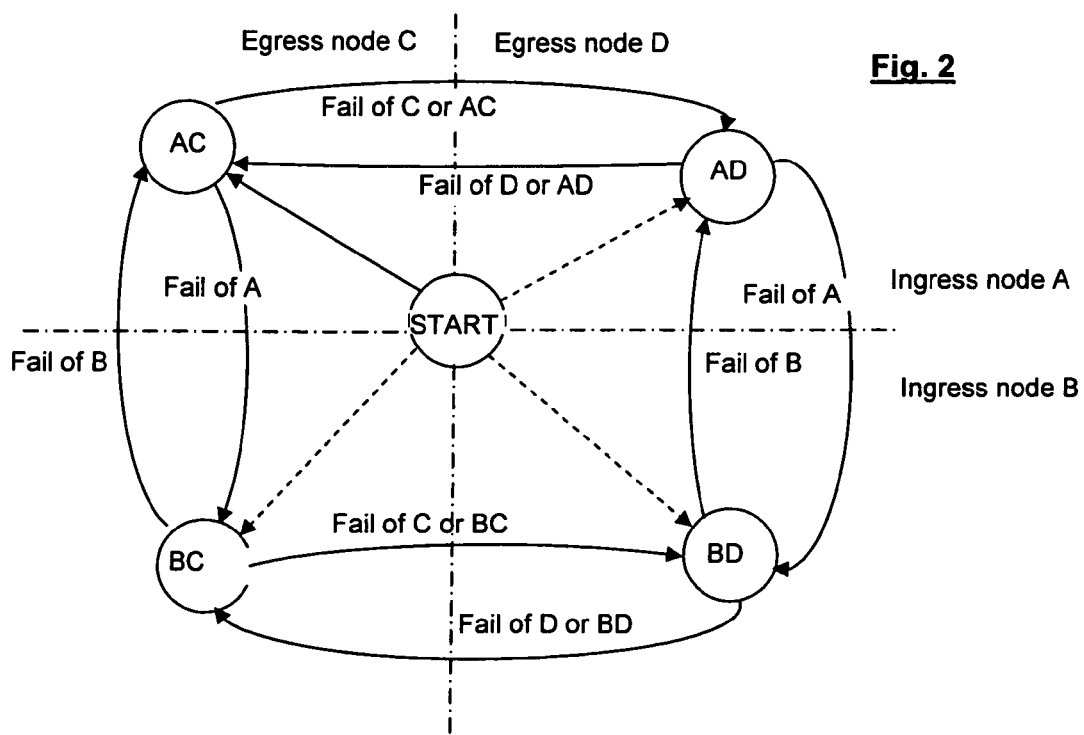
FIG. 2 is a state diagram illustrating changes in the operation of the network of FIG. 1.

Referring to FIG. 2, the status of the network can be described in terms of the active tunnel and how that will change depending on the detection of various faults. Where the ingress nodes 12 and 16 are indicated as A and B and the egress nodes 14, 18 are indicated as C and D, the state of the network can be indicated by the pair of active nodes, such as AC if the primary tunnel is active. Each state therefore corresponds to a different active tunnel between a different pair of nodes. In FIG. 2 the four states are indicated, the arrows between states indicate the possible transitions between states, and the labels on each of the arrows indicate the node as a single letter, or the LSP between two nodes by the appropriate two letters, in which a fault will cause the transition to occur. When the communication starts, the system first moves to the state AC because AC is the primary or default tunnel. However, if a fault is then detected in egress node C, or anywhere in the LSP AC between nodes A and C, the network switches to state AD, with the communication being sent to the standby egress node D. Similarly if a fault is detected in the ingress node A, then the network switches to state BD, with traffic being communicated via tunnel BD. It will be appreciated that there is a degree of flexibility as to which state the network moves to on detection of any particular fault. Apart from the need to avoid all nodes and LSPs with known faults, the choice may further depend on other factors such as the condition of the traffic on the network as a whole.

If the active ingress node 12 receives a message indicating a fault affecting the primary tunnel, but is still functioning itself, then it can re-direct the traffic to the appropriate secondary tunnel, and the new active egress node can transmit the traffic on to the receiving CE 26. Therefore neither of the CE units 24, 26 needs to take an active part in the process, except that the receiving CE obviously needs to be able to receive data from the secondary egress node. If a fault occurs which results in a need to switch to the secondary ingress node 16, the communication is transported in the secondary tunnel.

The CE unit 24 needs to be able to transmit data to the secondary ingress node 16 as well as to the primary ingress node 12. Optionally, external means can be used to communicate with the sending CE unit 24, instructing it to switch to sending the traffic to the secondary ingress node 16. This means can be a proprietary message set or proprietary extensions to existing protocols (e.g. Spanning Tree), and is conceived to shorten the time, which is necessary for the CE unit to become aware of the necessity to transmit traffic to the secondary ingress node (without waiting for the learning process to take place). The CE unit 24 therefore needs to be arranged to respond to instructions from either of the ingress nodes 12, 16 to switch from directing traffic to one of them to sending traffic to the other. However, in this embodiment, the sending CE unit 24 does not take an active part in determining which ingress node it should communicate with. It is however not required that the sending CE unit 24 is aware of any fault occurring in the MPLS network.

Figure 3:
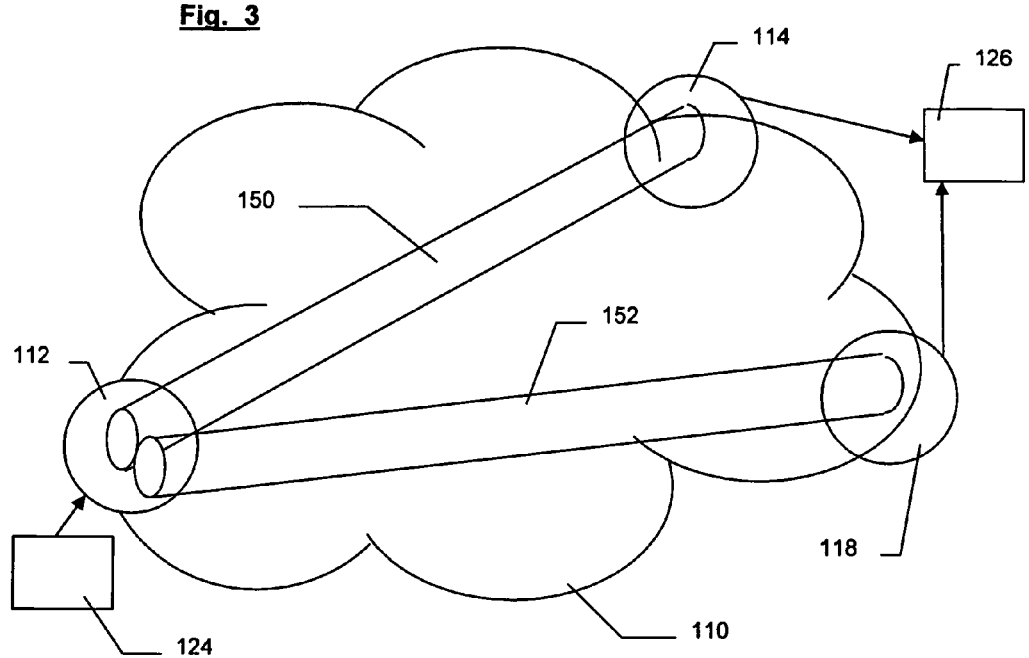
FIG. 3 is a diagram illustrating an MPLS network according to a further embodiment of the present invention.

Referring to FIG. 3 in a second embodiment of the invention, the basic setup is the same as in the first embodiment, and corresponding parts are indicated by the same reference numerals increased by 100. However in this case there is only one ingress node 124 which can communicate with either the primary 114 or secondary 118 egress node via respective primary and secondary tunnels 150, 152.

Figure 4:
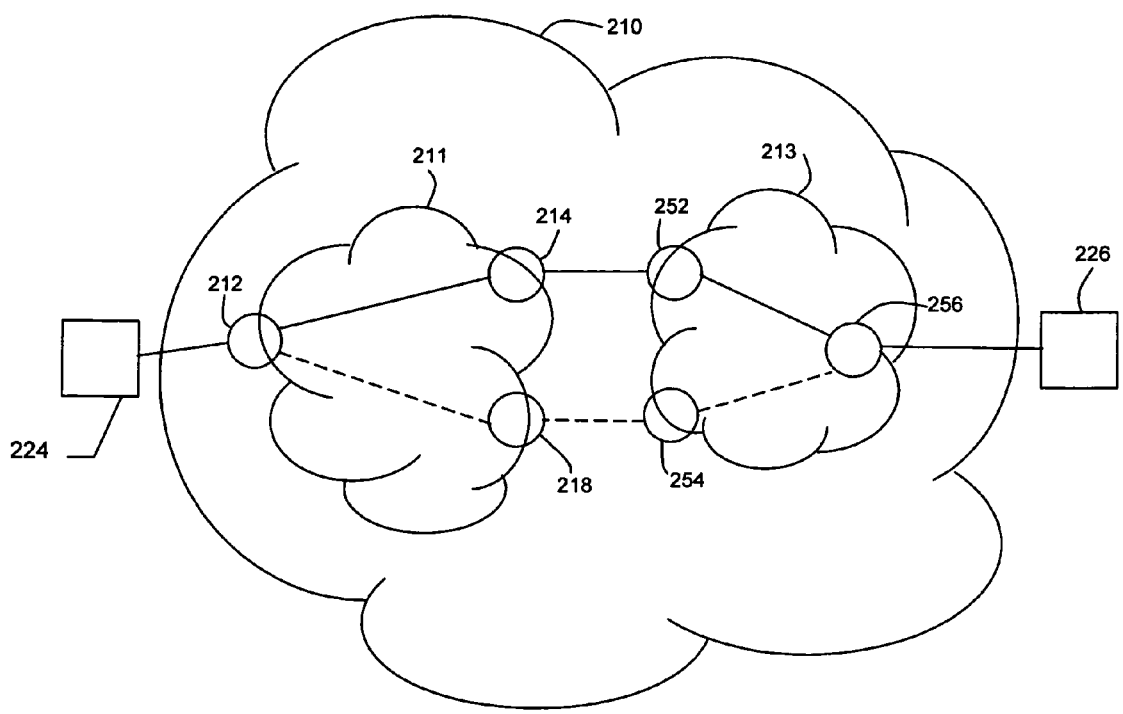
FIG. 4 is a diagram illustrating an MPLS network according to a further embodiment of the present invention.

Referring to FIG. 4, in a third embodiment, a service provider network 210 includes two MPLS networks 211, 213 run by different network operators. One CE unit 224 communicates with an edge node 212 of the first network 211, and a second CE unit 226 communicates with an edge node 256 of the second network 213. A first tunnel is defined between these two edge nodes 212, 256 via primary edge nodes 214, 252 in the first and second networks. A second tunnel is defined via secondary edge nodes 218, 254 in the first and second networks. Here all of the edge nodes 212, 214, 218, 252, 254, 256 are arranged to communicate with one another, in a similar manner to those of the first embodiment of FIG. 1, to identify any faults affecting the primary tunnel which would require transfer of the traffic to the secondary tunnel, and to keep each other updated regarding the status of each of the nodes and each of the tunnels as in the previous embodiments.

The invention claimed is:

1. A connection oriented communications network comprising:
    a plurality of nodes including a plurality of edge nodes, the network configured to:
        define a primary tunnel communicatively connecting together a primary pair of the edge nodes;
        define a secondary tunnel communicatively connecting together a secondary pair of the edge nodes that is different from the primary pair of the edge nodes; and
        control customer equipment, via an instruction sent by a first ingress node or a second ingress node to the customer equipment, to switch traffic from the primary tunnel to the secondary tunnel responsive to detecting a failure affecting the primary tunnel.

2. The network of claim 1 wherein the primary and secondary tunnels have different egress nodes.

3. The network of claim 1 wherein the primary and secondary tunnels have different ingress nodes.

4. The network of claim 1 wherein at least two of the edge nodes are configured to communicate with each other to identify a failure that requires a switch to the secondary tunnel.

5. The network of claim 4 wherein the at least two edge nodes comprise an ingress node and an egress node of the primary tunnel.

6. The network of claim 4 wherein the at least two edge nodes comprise a node of the primary tunnel and a node of the secondary tunnel.

7. The network of claim 4 wherein the at least two edge nodes comprise the ingress node of the primary tunnel and the ingress node of the secondary tunnel.

8. The network of claim 4 wherein the at least two edge nodes comprise the egress node of the primary tunnel and the egress node of the secondary tunnel.

9. The network of claim 1 further comprising:
    a plurality of ingress nodes;
    a plurality of egress nodes; and
    a tunnel defined between each of the ingress nodes and each of the egress nodes.

10. A node for a connection oriented network having a plurality of edge nodes, the node configured to:
    identify a primary tunnel communicatively connecting a primary pair of edge nodes;
    identify a secondary tunnel communicatively connecting a secondary pair of the edge nodes that are different from the primary pair of edge nodes; and
    control customer equipment, via an instruction sent by a first ingress node or a second ingress node to the customer equipment, to switch traffic from the primary tunnel to the secondary tunnel responsive to detecting a failure affecting the primary tunnel.

11. The node of claim 10 wherein the node comprises an edge node configured to communicate with one or more other edge nodes in the network to identify a failure in the network that requires switching the traffic to the secondary tunnel.

* * * * *

UNITED STATES PATENT AND TRADEMARK OFFICE
CERTIFICATE OF CORRECTION

PATENT NO.        : 8,787,150 B2
APPLICATION NO.   : 12/443708
DATED             : July 22, 2014
INVENTOR(S)       : Fiorone et al.

Page 1 of 1

It is certified that error appears in the above-identified patent and that said Letters Patent is hereby corrected as shown below:

Title Page

On Page 2, in Item (56), under "OTHER PUBLICATIONS", in Column 2, Line 1, delete "Mest" and insert -- Mesh --, therefor.

On Page 2, in Item (56), under "OTHER PUBLICATIONS", in Column 2, Line 8, delete "et al," and insert -- et al., --, therefor.

On Page 2, in Item (56), under "OTHER PUBLICATIONS", in Column 2, Line 19, delete "Lan" and insert -- LAN --, therefor.

On Page 2, in Item (56), under "OTHER PUBLICATIONS", in Column 2, Line 26, delete "Standy" and insert -- Standby --, therefor.

In the Specification

In Column 2, Line 21, delete "DESCRIPTION" and insert -- DETAILED DESCRIPTION --, therefor.

Signed and Sealed this
Seventh Day of July, 2015

Michelle K. Lee
*Director of the United States Patent and Trademark Office*